March 17, 1931.  J. V. ROBINSON  1,797,170
AUTOMATIC TRAIN PIPE CONNECTER
Original Filed March 9, 1920  3 Sheets-Sheet 3

INVENTOR
Joseph V. Robinson,
BY
ATTORNEYS.

Patented Mar. 17, 1931

1,797,170

UNITED STATES PATENT OFFICE

JOSEPH V. ROBINSON, OF NEW YORK, N. Y.

AUTOMATIC TRAIN-PIPE CONNECTER

Application filed March 9, 1920, Serial No. 364,401. Renewed October 5, 1928.

My invention relates to automatic train pipe connecter for railway cars and has among its objects to provide a simple form of such support in which the coupling head will be supported for free universal movement with the minimum resistance to such movement.

Other novel features of my improvement will appear from the following specification and the accompanying drawings, in which.

Figure 1:
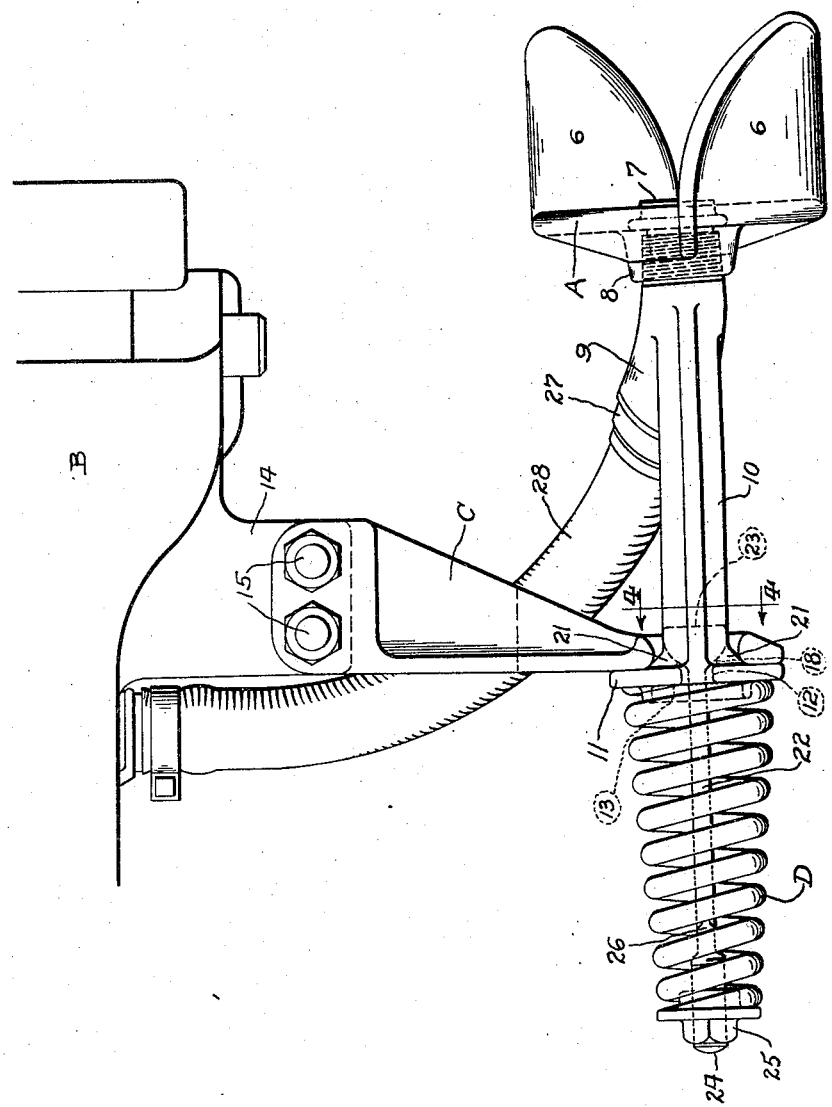
Figure 1 is a side elevation of my improved coupling.
Figure 2:
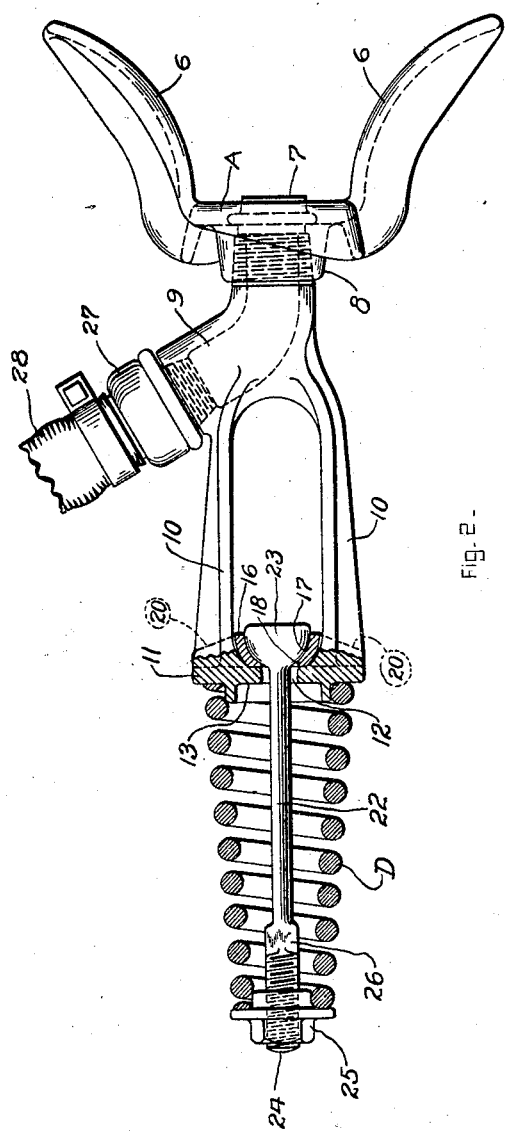
Figure 2 is a longitudinal plan view with some of the parts shown in section.
Figure 3:
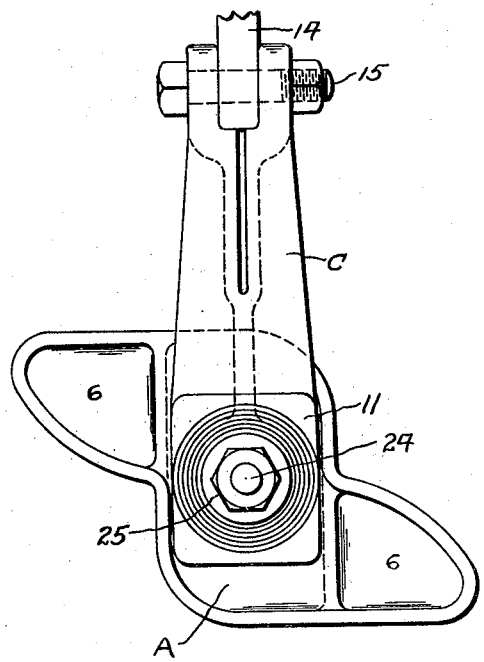
Figure 3 is a rear elevation of the structure shown in Figure 1.
Figure 4:
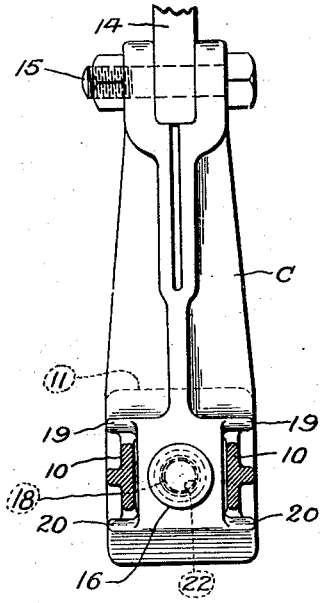
Figure 4 is a front elevation of the bracket or base member of my improvement showing some of the parts in section on line 4—4 of Figure 1.
Figure 5:
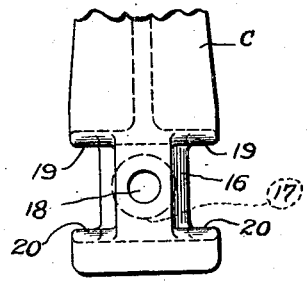
Figure 5 is a rear view of the lower portion only of the bracket member of my improvement.

Referring to the drawings. Any suitable coupling head A having guiding means 6 for aligning the head with a counterpart head, may be used with my improvement. I preferably employ a coupling head of the butt face type carrying at its forward face a gasket 7 and having on its rear side a threaded nipple 8 adapted to threadingly receive the laterally diverging fluid conduit 9 of my improvement. Formed integrally with the fluid conduit 9 and extending rearwardly thereof I provide a pair of spaced ribs or members 10 which form a support for the head and which are joined at their rear ends by a vertically extending flange, part or projection 11 having a perforation 12 and a seat 13—see especially Figure 2. Pending downwardly from a lug 14 suitably connected to the car coupler B, I provide a base or bracket C which strides the lug 14 and is connected thereto in any desired manner as by bolts 15. The lower portion of the bracket is provided with an I shaped portion, the crosses of which are joined by a section 16 in the front face of which is formed a partly spherical concave seat 17 having an opening 18—see Figure 5— normally aligned with the opening 12 in the flange 11. Between the crosses 19 and 20 of the base C, the members 10 extend and contact therewith to prevent undue rotation of the coupling head A about its longitudinal axis; the flared portions 21 of the members 10 serving to augment the effectiveness of this preventive means and to properly position the flange 11 and the members 10 when my improvement is uncoupled. Inasmuch as the base C and the concave seat 17 therein lie between the members 10 and in front of the flange 11, it may be said that the base is embraced or surrounded by these members. Extending rearwardly through the opening 18 in the seat 17 and through the opening 12 in the flange 11 is a pivot device or tie rod 22 having a partly spherical convex head 23 pivotally mounted in the seat 17. Upon the rear end of the pivot device 22 I provide a threaded portion 24 adapted to adjustably receive an abutment 25, the member 22 being flattened or squared at 26 to receive a spanner or wrench for preventing rotation of the member 22 during adjustment of the abutment 25. Between the abutment 25 and the flange 11 and surrounding the member 22 and resting upon the seat 13, I provide a buffer spring D for extending the coupling head A forwardly of the bracket and flexibly maintaining the head at the limit of its forward movement. Normally the spring D is under sufficient compression, accomplished by adjusting the abutment 25, to thus extend the head and support it for universal movement. The foregoing construction provides an improved support comprising a hollow body formed by the conduit 9, the members 10 and the flange 11 and in which the minimum resistance to free universal movement of the coupling head A is presented. In assembling my improvement the base C is rotated to an angle of 90 degrees from the position in which it is shown in Figure 2. It is then passed downwardly between the members 10 until such members align with the crosses or overhanging portions 19 and 20 of the base whereupon the base is rotated to the position shown in Figures 1, 2 and 4. The pivot device 22 is then mounted in the seat 17, the spring D placed in position and the abutment 25 applied. Any suitable means 27 may be employed to attach the usual train pipe hose 28 to the conduit 9 of my improvement.

What I claim as new is:

1. In an automatic train pipe connecter, the combination of a base, a coupling head, a support therefor comprising spaced members connected to said head and extending rearwardly thereof past said base, a part carried by said support and resting normally against the rear side of said base, a partly spherical concave seat on said base and lying between said members and provided with an opening which extends through said base on the axis of said seat, a pivot device extending through said opening and having at one end a partly spherical convex head pivotally mounted in said seat and being provided at its other end with an abutment, and a spring confined between said abutment and said support for extending said coupling head.

2. In an automatic train pipe connecter, the combination of a base, a coupling head, spaced members connected to said head and extending rearwardly thereof past said base, a projection on said members and resting normally against the rear side of said base, a partly spherical concave seat on said base and lying between said members and provided with an opening which extends through said base on the axis of said seat, a pivot device extending through said opening and having at one end a partly spherical convex head pivotally mounted in said seat and being provided at its other end with an abutment, a spring confined between said abutment and the projection on said members for extending said coupling head, and means cooperating with said base to prevent undue rotation of said head about its longitudinal axis.

3. In an automatic train pipe connecter, the combination of a coupling head, a member connected with said head and extending rearwardly thereof and having on its rear end a perforated projection, a base lying in front of said projection and having a perforated partly spherical concave seat, a pivot device extending thru the perforation in said projection and said seat and having at one end a partly spherical head pivotally mounted in said seat and being provided at its other end with an abutment, and a spring interposed between said abutment and said projection for yieldingly extending said coupling head with said projection normally resting against the rear side of said base.

4. In an automatic train pipe connecter, in combination, a coupling head, a support secured thereto and extending rearwardly therefrom and including spaced members, a bracket rigidly secured to the car coupler and extending downwardly between the spaced members of said support and having an opening adjacent its lower end, a part secured to said support and adapted to bear against the rear face of said bracket, cooperating means on said spaced members and said bracket for preventing undue rotation of said support on its longitudinal axis, a tie rod extending through said opening in the bracket and having a head rigidly secured thereto for engaging the front face of the bracket, an adjustable abutment on the rear of said rod, and a coiled spring surrounding said rod and arranged between said abutment and said support.

5. In an automatic train pipe connecter, in combination, a coupling head, a support secured thereto and extending rearwardly therefrom and including spaced members, a bracket rigidly secured to the car coupler and extending downwardly between the spaced members of said support, said bracket having a portion provided with substantially straight vertically arranged edge walls and the inner surface of said spaced members having substantially straight walls adapted to engage the edge walls of said bracket, means extending laterally of said edge walls of the bracket for holding said spaced members in position and preventing undue rotation of said support on its longitudinal axis, a flange or projection secured to said spaced members and adapted to bear against the rear face of said bracket, said bracket having an opening arranged between said edge walls thereof, a tie rod extending through said opening and having a head rigidly secured thereto for engaging the front face of the bracket, an adjustable abutment on said rod, and a coiled spring surrounding said rod and bearing against said abutment and projection.

6. In an automatic train pipe connecter, in combination, a coupling head, a support secured thereto and extending rearwardly therefrom and including spaced members, a bracket rigidly secured to the car coupler and extendng downwardly between the spaced members of said support, said bracket having a portion provided with substantially straight vertically arranged edge walls and the inner surface of said spaced members having substantially straight walls adapted to engage the edge walls of said bracket, means extending laterally of said edge walls of the bracket for holding said spaced members in position and preventing undue rotation of said support on its longitudinal axis, a flange or projection secured to said spaced members and adapted to bear against the rear face of said bracket, a tie rod extending through said bracket and pivotally engaging the same, an adjustable abutment on said rod and a coiled spring arranged between said abutment and said projection.

7. In an automatic train pipe connecter, the combination of a base having an opening adjacent its lower end, a coupling head, spaced members connected to said head and extending rearwardly thereof past said base, a projection on said members for engaging the rear side of said base, said base having a seat thereon adjacent said opening and rigid with said base, a pivot device extending through said opening and having at one end a head rigidly secured thereto for pivotally engaging said seat and having at its other end an abutment, and a spring confined between said abutment and the projection on said members.

8. In an automatic train pipe connecter, the combination of a base having an opening adjacent its lower end, a coupling head, spaced members connected to said head and extending rearwardly thereof past said base, a projection on said members for engaging the rear side of said base, said base having a curved seat thereon adjacent said opening and rigid with said base, a pivot device extending through said opening and provided with a curved surface for pivotally engaging said curved seat and having at its other end an abutment, and a spring confined between said abutment and the projection on said members.

9. In an automatic train pipe connecter, in combination, a coupling head, a support secured thereto and extending rearwardly and including spaced members, a bracket extending downwardly between said spaced members, said members at their rear ends having a projection adapted to engage the rear face of the bracket, said bracket having an opening adjacent its lower end arranged between said spaced members, a pivot device extending through said opening, said device having a head rigidly secured thereto for pivotally engaging the front face of the bracket, an abutment on the rear end of said pivot device and a spring surrounding said device between said abutment and said projection.

10. In an automatic train pipe connecter, in combination, a coupling head, a support secured thereto and extending rearwardly therefrom and including spaced members, a bracket rigidly secured to the car coupler and extending downwardly between the spaced members of said support and having an opening adjacent its lower end, a seat surrounding said opening, cooperating means on said spaced members and said bracket for preventing undue rotation of said support on its longitudinal axis, a tie rod extending through said opening in the bracket and having a head rigidly secured thereto for engaging said seat, an adjustable abutment on the rear of said rod, and a coiled spring surrounding said rod and arranged between said abutment and said support.

11. In an automatic train pipe connecter, the combination of a base having an opening adjacent its lower end, a coupling head, a support for said head comprising spaced members connected to said head and extending rearwardly thereof past said base, said base having a seat thereon adjacent said opening and rigid with said base, a pivot device extending through said opening and having at one end a head rigidly secured thereto for pivotally engaging said seat and having at its other end an abutment, and a spring arranged between said abutment and said support.

12. In an automatic train pipe connecter, the combination of a base having an opening adjacent its lower end, a coupling head, a support for said head comprising spaced members connected to said head and extending rearwardly thereof past said base, said base having a curved seat thereon adjacent said opening and rigid with said base, a pivot device extending through said opening and provided with a curved surface for pivotally engaging said curved seat and having at its other end an abutment, and a spring arranged between said abutment and said support.

13. In an automatic train pipe connecter, in combination, a coupling head, a support therefor, said support being connected to said head and extending rearwardly thereof and comprising spaced members, a bracket extending downwardly between said spaced members, said bracket above and below said spaced members having portions projecting laterally beyond the inner surfaces of said members, a part carried by the rear ends of said spaced members for engaging the rear side of said bracket, the rear ends of said spaced members adjacent said last named part being flared in a vertical plane, said flared portions cooperating with said laterally projecting portions on the bracket to position said head and supporting member when the same are pressed forwardly, and means for pressing said member and head forwardly.

14. In an automatic train pipe connecter, in combination, a coupling head, a member connected thereto and extending rearwardly thereof and having spaced arms, a bracket rigidly secured to the car coupler and extending downwardly into and through the space between said arms, and having a curved seat on its front face, said member having at its rear end a portion which normally rests against the rear side of said bracket, said member being flared vertically at points adjacent to said portion, said bracket above and below said member having projections which extend laterally beyond the inner walls of the arms of said member, said projections and said flared portions serving to position said head and said member and to prevent undesired rotation of the head and member when they are pressed forwardly to the limit of their forward movement, a tie rod extending from the rear of said member into the space between said arms and mounted on said seat for rocking movement thereon, a coiled spring supported by said tie rod and bearing against said portion for pressing said member and said coupling head forwardly, and means for retaining said spring in position under compression.

In testimony whereof I hereby affix my signature.

JOSEPH V. ROBINSON.